UNITED STATES PATENT OFFICE 2,172,861

MAGNESIA INSULATION AND THE METHOD OF MAKING THE SAME

Earle R. Williams, North Plainfield, N. J., assignor to Johns-Manville Corporation, New York, N. Y., a corporation of New York No Drawing. Application January 29, 1936, Serial No. 61,311. Renewed December 22, 1938

2 Claims. (Cl. 18—47.5)

This invention relates to magnesia insulation of minimized brittleness and the method of making the same.

The invention pertains especially to so-called 85% magnesia. Such insulation comprises magnesium basic carbonate and asbestos fibres in the proportions of approximately 85 parts by weight of the basic carbonate to 15 parts, or so, of asbestos.

One conventional method of making such insulation, upon which the present invention is an improvement, includes carbonation of magnesium oxide in dilute aqueous suspension, to form the carbonate, forming a mixture of asbestos fibres with the carbonate and water of the said suspension, shaping the mixture, converting the wet carbonate therein largely to basic carbonate, and then subjecting the resulting product to drying.

When this process is used, there is produced a product of undesired brittleness; the brittleness interferes with handling, shipping or using the product without excessive breakage.

These difficulties may be responsible, in part, at least, for the fact that most of the magnesia insulation made in the United States is produced by a process that involves the initial carbonation of magnesia in aqueous suspension to the bicarbonate stage, with subsequent heating to precipitate the basic carbonate from the solution of the bicarbonate and thereafter passing the slurry of carbonate after admixture of asbestos fibres therewith into a filtering mold under pressure to form the desired shaped product and to separate the water content of the slurry. Such pressure molding operations are to be distinguished from the procedure involved by my invention, which contemplates the formation of a "self-setting" shaped product independently of the application of pressure during the molding operation.

It is an object of the present invention to provide an improvement upon the first-mentioned process and produce a product of minimized brittleness, as compared to insulation heretofore made by this process. Other objects and advantages will appear from the detailed description that follows.

The invention comprises the novel features of product and method herein described and, particularly, the admixture of a small proportion of a soap before molding the mixture including magnesium carbonate, asbestos, and water.

An embodiment of the invention that is preferred at this time is illustrated by the following specific example.

There is formed, first of all, a dilute aqueous suspension of finely divided magnesium oxide, as, for instance, a suspension of finely ground calcined magnesite, in about 15 to 25 times its weight of water.

Into this suspension, there is bubbled and absorbed carbon dioxide in amount to cause conversion of the suspended magnesium oxide largely to hydrated magnesium carbonate, the carbonate formed remaining suspended and being probably predominantly of the formula $MgCO \cdot 3H_2O$.

There is then formed an intimate mixture of the carbonate-water suspension with asbestos fibres and a small proportion of soap.

The asbestos fibres admixed are preferably amosite, although other fibres, such as those of well dispersed chrysotile asbestos, may be used if the extra weight of the latter fibres for a given bulk is not objectionable. As indicated, the amosite fibres give a large bulk for a given weight and, consequently, an overall low density of the finished insulation.

A suitable proportion is 42 parts by weight of fibres to 100 parts by weight of magnesia, calculated as the oxide.

As the soap to be added, as described above, I have used satisfactorily a water-soluble soap such as the saponification product of red oil (crude oleic acid) and tallow. Thus, the soap may contain a sodium or potassium salt of the common higher fatty acids and may, also, contain a certain amount of glycerine or other by-product of the saponification of a fat or red oil with an alkali under usual soap-making conditions.

The composition comprising water, magnesium carbonate, asbestos fibres, and soap is made intimate as by mechanical agitation or bubbling of a gas therethrough. The result is a thick creamy mixture of castable consistency.

This mixture is introduced into molds of suitable size and shape and is there heated to an elevated temperature, adapted to cause conversion of the magnesium carbonate to magnesium basic carbonate, as, for instance, at a temperature of about 150° F. During this conversion there is thickening or setting of the mass to a shape-retaining product.

The shape-retaining product is removed from the mold and is subjected to an elevated temperature to produce drying. Thus, the molded product may be supported on suitable trays or pallets and placed in a drying oven at a temperature of, say, 212 to 300° F.

In comparing the insulation made by my improved process, involving the use of a small proportion of soap, with insulation made by a process otherwise the same, but omitting the soap, a decided and important difference is noted.

When the product made as heretofore is subjected to moderate bending stress, there results a sharp and severe fracture, the asbestos fibres extending on the two sides of the fracture being sharply severed at the zone of fracture. When, on the other hand, my improved product containing the soap is subjected to the same stress, there is either no breakage at all, a fracture that does not extend completely through the article, or the fibres extending originally on both sides of the zone of fracture are partly or completely pulled out at one end, thus showing considerable slippage of the fibres in the composition before or without rupture of the fibres.

It is not necessary to the invention to explain the mechanism to which the improvement is due. It is a fact, however, that brittleness is minimized so as to make the magnesia insulation, including soap and made as described, satisfactory from the standpoint of minimized brittleness, for the usual purposes for which magnesia insulation is used.

It is probable that the cause of my improvement may reside, in large part, in the reaction of the soap with the superficial portions of the particles of magnesium carbonate, with attendant desirable effect upon the exterior portions of the particles of basic carbonate formed by conversion from the carbonate or in increasing the yieldability, before breakage, of the bonding of the asbestos fibres in the magnesium basic carbonate.

The basic carbonate, in my finished product, is in the condition of having been formed directly from, and in situ with respect to the position originally occupied by, the normal carbonate.

It will be understood that the details given are for the purpose of illustration, not restriction, and that variations within the spirit of the invention are intended to be included within the scope of the appended claims.

What I claim is:

1. In making magnesia insulation, the method which comprises forming a dilute suspension of finely divided magnesium oxide in water, treating the said suspension with carbon dioxide, to convert the magnesium oxide largely to magnesium carbonate, forming an intimate mixture, of castable consistency, including the said carbonate, water, asbestos fibres, and a small proportion of a water-soluble soap, shaping the said mixture in a mold, heating the molded material to an elevated temperature adapted to convert the wet magnesium carbonate therein to magnesium basic carbonate and cause setting of the said material to a shape-retaining product, removing the product from the mold, and subjecting the said product to an elevated temperature to produce drying.

2. A cast light-weight shaped composition adapted for use as a heat insulation material, comprising a magnesium carbonate self-set into the desired shape independent of the application of pressure, asbestos fibres, and a relatively small amount of the reaction product of a soluble soap with the magnesium carbonate.

EARLE R. WILLIAMS.